(12) United States Patent
Huang

(10) Patent No.: US 7,257,155 B2
(45) Date of Patent: Aug. 14, 2007

(54) METHOD FOR INITIALIZATION AND STEPSIZE CONTROL OF TIME-DOMAIN EQUALIZER IN MULTI-CARRIER COMMUNICATION SYSTEM

(75) Inventor: Fong-Ching Huang, KaoHsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 715 days.

(21) Appl. No.: 10/781,889

(22) Filed: Feb. 20, 2004

(65) Prior Publication Data

US 2004/0165674 A1 Aug. 26, 2004

(30) Foreign Application Priority Data

Feb. 21, 2003 (TW) .............................. 92103588 A

(51) Int. Cl.
*H03K 5/159* (2006.01)
*H04K 1/10* (2006.01)
*H04L 27/28* (2006.01)

(52) U.S. Cl. ..................... 375/231; 375/260

(58) Field of Classification Search ................. 375/231, 375/232, 260, 261, 340, 350
See application file for complete search history.

(56) References Cited

U.S. PATENT DOCUMENTS

| 5,285,474 A | | 2/1994 | Chow et al. | |
| 6,097,763 A | * | 8/2000 | Djokovic et al. | ............ 375/260 |
| 2002/0176509 A1 | * | 11/2002 | Gatherer et al. | ............ 375/260 |
| 2006/0062290 A1 | * | 3/2006 | Liang | ......................... 375/232 |
| 2006/0115030 A1 | * | 6/2006 | Erving et al. | ............... 375/348 |

OTHER PUBLICATIONS

Jack S. Chow, Jerry C. Tu, and J.M. Cioffi, "A Discrete Multitone Transceiver System for HDSL Applications", IEEE J. on Sel Areas in Comm., vol. 9, No. 6, pp. 895-908, Aug. 1991.

J.S. Chow, J. M. Cioffi, and J.A.C. Bingham, "Equalizer training algorithms for multicarrier modulation system", ICC, pp. 761-765, May 1993.

(Continued)

*Primary Examiner*—Don N. Vo
(74) *Attorney, Agent, or Firm*—Troxell Law Office, PLLC

(57) ABSTRACT

The present invention provides a method for initialization and stepsize control of a time-domain equalizer (TEQ) in a receiver of a multi-carrier communication system to upgrade the performance of adaptive TEQ algorithms. As to TEQ initialization, the Time-domain Window Mask method generates a modified channel impulse response (CIR) by performing a locate maximum energy algorithm and then applies a time-domain window mask to adjust the modified CIR to obtain an initial value of a target impulse response. Then, a dividing operation is performed on the frequency-domain initial target impulse response and the modified CIR to determine an initial value of the frequency-domain TEQ impulse response. The Head-tail Equalizing method also performs the locate maximum energy algorithm, and the remaining points other than the consecutive points with maximum energy are combined and padded zero to the last few points to generate a modified CIR. The reciprocal of the frequency-domain modified CIR is determined to be an initial value of the frequency-domain TEQ impulse response. The initial value of the frequency-domain target impulse response is determined by multiplying the determined frequency-domain. TEQ impulse response with the frequency-domain of the CIR. The stepsize control method configures the stepsize coefficient as a time-varying coefficient during the whole adapting TEQ algorithm. It is smaller value at an early stage to prevent from divergence and becomes larger at a late adapting stage to prevent from slow convergence.

32 Claims, 7 Drawing Sheets

OTHER PUBLICATIONS

J.W. Melsa, Richard C. Younce and Charles E. Rohrs, "Impulse Response Shortening for Discrete Multitone Transceivers", IEEE Trans. on Comm., vol. 44, No. 12, pp. 1662-1672, Dec. 1996.

N.Al-Dhahir and J.M. Cloffi, "Efficiently computed reduced-parameter input-aided MMSE equalizers for ML detection: A unified approach", IEEE Trans. on Info. Theory, vol. 42, pp. 903-915, May 1996.

N. Al-Dhahir and J.M. Cioffi, "Optimum finite-length equalization for multicarrier transceivers", IEEE Trans. on Comm., vol. 44, pp. 56-63, Jan. 1996.

Werner Henkel, and Thomas Kessler, "Maximizing the Channel Capacity of Multicarrier Transmission by Suitable Adaptataion of the Time-Domain Equalizer", IEEE Trans. on Comm., vol. 48, No. 12, Dec. 2000.

Katleen et al., "Per Tone Equalization for DMT-Based Systems", IEEE Trans. on Comm., vol. 49, No. 1, Jan. 2001.

Guner Arslan et al., "Equalization for Discrete Multitone Transceivers to Maximize Bit Rate", IEEE Trans. on Signal processing, Draft, pp. 1-36, Jul. 19, 2001.

* cited by examiner

METHOD FOR INITIALIZATION AND STEPSIZE CONTROL OF TIME-DOMAIN EQUALIZER IN MULTI-CARRIER COMMUNICATION SYSTEM

BACKGROUND OF THE INVENTION (a). Field of the Invention

The present invention relates in general to a multi-carrier communication system, and more particularly to a method for initiation and stepsize control of a time-domain equalizer in a multi-carrier communication system.

(b). Description of the Prior Arts

Multi-carrier modulation is widely used in communication systems nowadays. FIG. 1 is a block diagram of a communication system 100 using multi-carrier modulation. The communication system 100 employs a set of N-point Inverse Fast Fourier Transform (IFFT) 102 in the transmitter and the Fast Fourier Transform (FFT) 111 in the receiver to transceive data. A channel 106 is divided into N subchannels for transmitting data. The signal transmitted by one subchannel is orthogonal to those transmitted by any other subchannels. Thus, the signal transmitted by the subchannels would not interfere each other, and inter-channel interference (ICI) can be avoided.

The set of N-point data outputted from IFFT 102 is called a symbol. Since the channel impulse response (CIR) is not ideal, that is, the amplitude/frequency response of the channel are not constant across the all used subchannels, then the received signals will different from the transmitted signal, and the signals presented to the QAM decoder 113 will different from the signals outputted from the QAM encoder 101. If the distortion is severe then the data transmitted by one subchannel will affect both the data transmitted by other subchannels (ICI) and the data transmitted by that subchannel in the previous and subsequent symbol periods (intersymbol interference, ISI). In order to avoid inter-symbol interference (ISI) and ICI, a "cyclic prefix" (CP) is added to each symbol, i.e. the last υ points of each symbol are copied and added in the front of the symbol, as shown in FIG. 2. Therefore, each symbol outputted from adding cyclic prefix circuit 103 includes (N+v) points. The adding cyclic prefix circuit 103 in the transmitter and the removing cyclic prefix circuit 110 in the receiver of FIG. 1 are used to add and remove cyclic prefixes, respectively.

In the communication system 100 of FIG. 1, if the valid length of channel impulse response (CIR, denoted by h[n]) is shorter than the length of cyclic prefix, then a symbol, after being transmitted in the channel 106 and received by the receiver (i.e. the convolution of the symbol and the CIR, h[n]), would not affect the data of the subsequent symbol received in the subsequent symbol period. However, if the length of CIR is larger than that of the cyclic prefix, then ICI and ISI will occur. Under this circumstance, a time-domain equalizer (TEQ) with an impulse response w[n], as shown in the block 108 of FIG. 1, is necessary for the receiver of the system 100. The TEQ 108 is used to modify the CIR of the communication system 100, such that valid length of the modified CIR (called target impulse response and denoted by b[n]), i.e. the convolution of the CIR h[n] and the TEQ impulse response w[n], is shorter than that of the cyclic prefix, thereby preventing the received data from ICI and ISI.

Since the CIR is different with various transmission channels, the TEQ impulse response needs to be adjusted accordingly. Many adaptive TEQ algorithms are developed in succession. Since these adaptive TEQ algorithms are sensitive to initial values of TEQ impulse response W[n] and target impulse response B[n] in frequency-domain (In the following description, time-domain variables will be referred to by lower-case letters and frequency-domain variables will be referred to by capital letters), the adapting result would be unreliable if the initial values are not properly determined during the TEQ initialization process. The adapting result will fail into the local maxima point.

U.S. Pat. Nos. 5,285,474 and 6,396,886 disclosed the conventional adaptive TEQ algorithms. However, both of these two patents failed to disclose the method to determine the initial values of frequency-domain TEQ impulse response W[n] and target impulse response B[n]. In addition, the coefficient (called stepsize coefficient in this specification) used to stepwise adjust W[n] using frequency-domain Least Mean Square (LMS) will greatly affect the performance of the adaptive TEQ algorithms. If the stepsize coefficient is set too small, the converging speed will be too slow; if too large, then a diverging result will occur frequently. Both cases would degrade the system performance seriously.

SUMMARY OF THE INVENTION

In view of the above-description, it is one of the objects of the present invention to provide a method for initializing and stepsize controlling a time-domain equalizer (TEQ) for use in a multi-carrier communication system to upgrade the performance of the TEQ performing the adaptive TEQ algorithms.

According to the object of the present invention disclosed above, one of the embodiment of the present invention discloses a method for initializing a time-domain equalizer (TEQ) comprised in a receiver of a multi-carrier communication system, the method comprising: estimating a channel impulse response (CIR) h[n] according to a received symbol, wherein the received symbol includes a cyclic prefix with v points and a data portion with N points, wherein i=0~N−1; selecting one of a plurality of groups according to the total energy of the groups, wherein each group includes consecutive v points of the received symbol; modifying the channel impulse response (CIR) h[n] according to the selected group to generate a modified channel impulse response h'[n]; generating a target impulse response b[n] according to the modified channel impulse response h'[n] and a window mask m[n], wherein i=0~N−1; transforming the channel impulse response (CIR) h[n] and the target impulse response b[n] to a frequency-domain to generate a frequency-domain channel impulse response H(i) and a frequency-domain target impulse response B(i) respectively, wherein i=0~N−1; and generating a frequency-domain impulse response W(i) of the time-domain equalizer according to the frequency-domain channel impulse response H(i) and the frequency-domain target impulse response B(i). The frequency-domain target impulse response B(i) and the frequency-domain TEQ impulse response W(i) are for initializing the TEQ.

Another embodiment of the present invention discloses a method for initializing a time-domain equalizer (TEQ) comprised in a receiver of a multi-carrier communication system, the method comprising: estimating a channel impulse response (CIR) h[n] according to a received symbol, wherein the received symbol includes a cyclic prefix with v points and a data portion with N points, wherein i=0~N−1; selecting one of a plurality of groups according to the total energy of the groups, wherein each group includes consecutive v−1w points of the received symbol, wherein 1w is the length of the TEQ impulse response; modifying the channel impulse response (CIR) h[n] according to the selected group to generate a modified channel impulse response h'[n]; determining a frequency-domain impulse response W(i) according to a frequency-domain modified channel impulse response H'(i), wherein i=0~N−1; and determining a frequency-domain target impulse response B(i) according to the frequency-domain impulse response. W(i) and a frequency-domain CIR H(i), wherein i=0~N−1. The frequency-domain target impulse response B(i) and the frequency-domain TEQ impulse response W(i) are for initializing the TEQ.

Still another embodiment of the present invention discloses a method for adapting a time-domain equalizer (TEQ) comprised in a receiver of a multi-carrier communication system, the method comprising: determining a frequency-domain TEQ impulse response $W_k(i)$ and a frequency-domain target impulse response Bk(i) for initializing the TEQ, wherein i=0~N−1; generating a modified TEQ impulse response $w_{k,w}(i)$ and a modified target impulse response $b_{k,w}(i)$ according to a time-domain TEQ impulse response wk(i) and a time-domain target impulse response $b_k(i)$; determining a error term $E_k(i)$ according to the modified TEQ impulse response $w_{k,w}(i)$, a modified target impulse response $b_{k,w}(i)$, and a frequency-domain channel impulse response (CIR) H(i); adjusting the frequency-domain TEQ impulse response $W_k(i)$ to generate a adjusted frequency-domain TEQ impulse response $W_{k+1}(i)$ through performing a least mean square (LMS) operation according to the error term $E_k(i)$, a frequency-domain modified TEQ impulse response $W_{k,w}(i)$, a frequency-domain channel impulse response (CIR) H(i), and a stepsize coefficient μ, wherein the stepsize coefficient μ in a time-varying coefficient; generating a modified adjusted frequency-domain TEQ impulse response $W_{k+1,w}(i)$ according to the adjusted frequency-domain TEQ impulse response $W_{k+1}(i)$; and adjusting the frequency-domain target impulse response $B_k(i)$ to generate a adjusted frequency-domain target impulse response $B_{k+1}(i)$ according to the modified adjusted frequency-domain TEQ impulse response $W_{k+1,w}(i)$ and the frequency-domain channel impulse response (CIR) H(i).

These and other objectives of the present invention will no doubt become obvious to those of ordinary skill in the art after reading the following detailed description of the embodiments that is illustrated in the various figures and drawings.

DETAILED DESCRIPTION OF THE EMBODIMENTS

Figure 1:
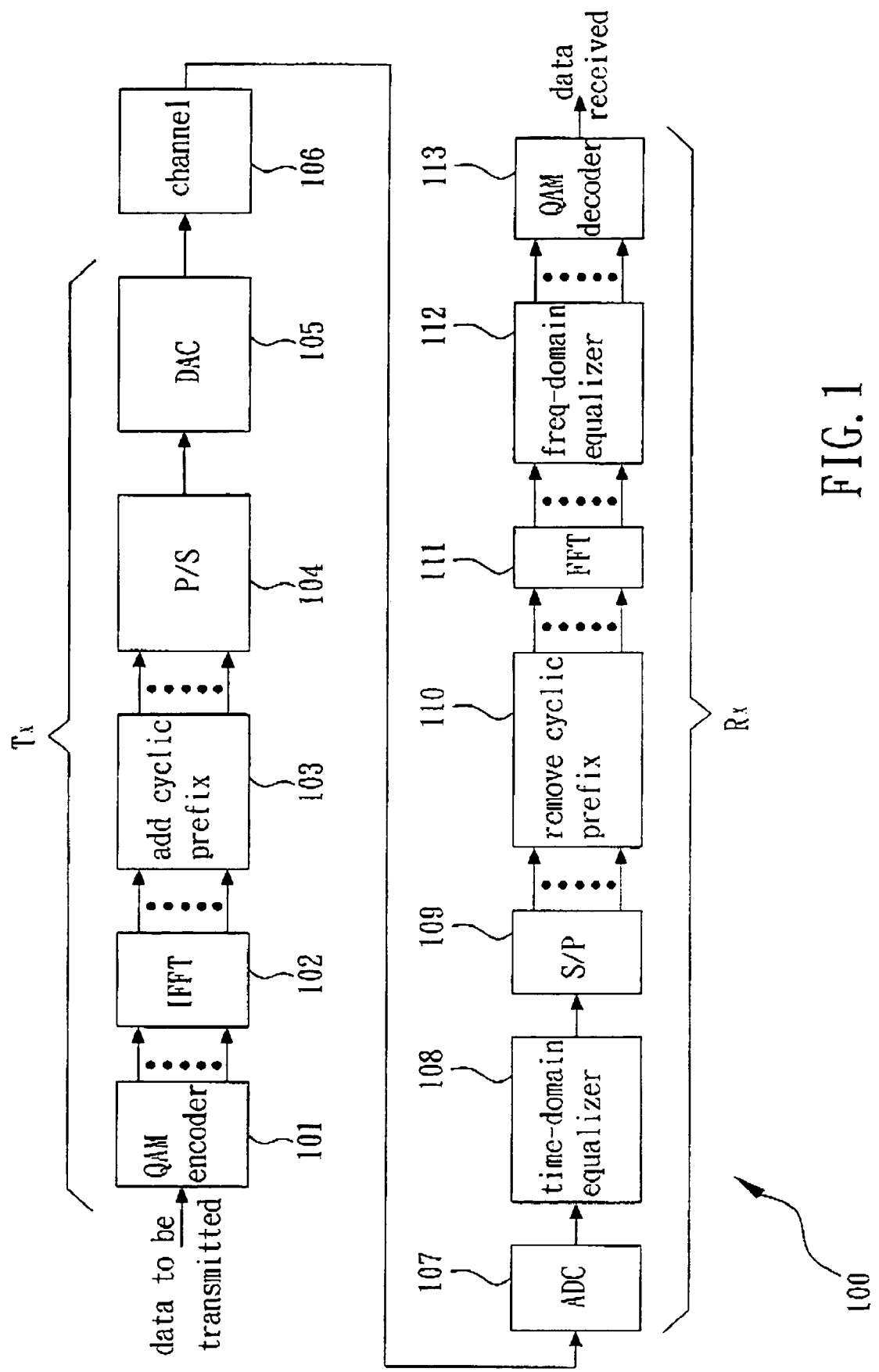
FIG. 1 is a block diagram of a communication system using multi-carrier modulation.
Figure 2:
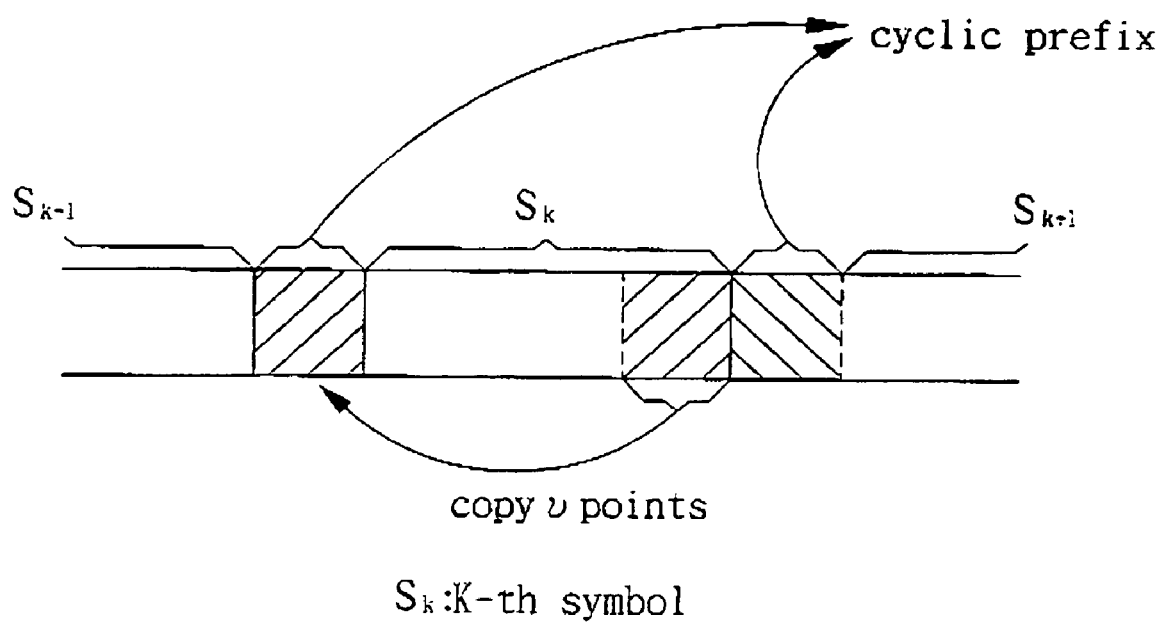
FIG. 2 is a diagram showing the formation of a cyclic prefix.
Figure 3:
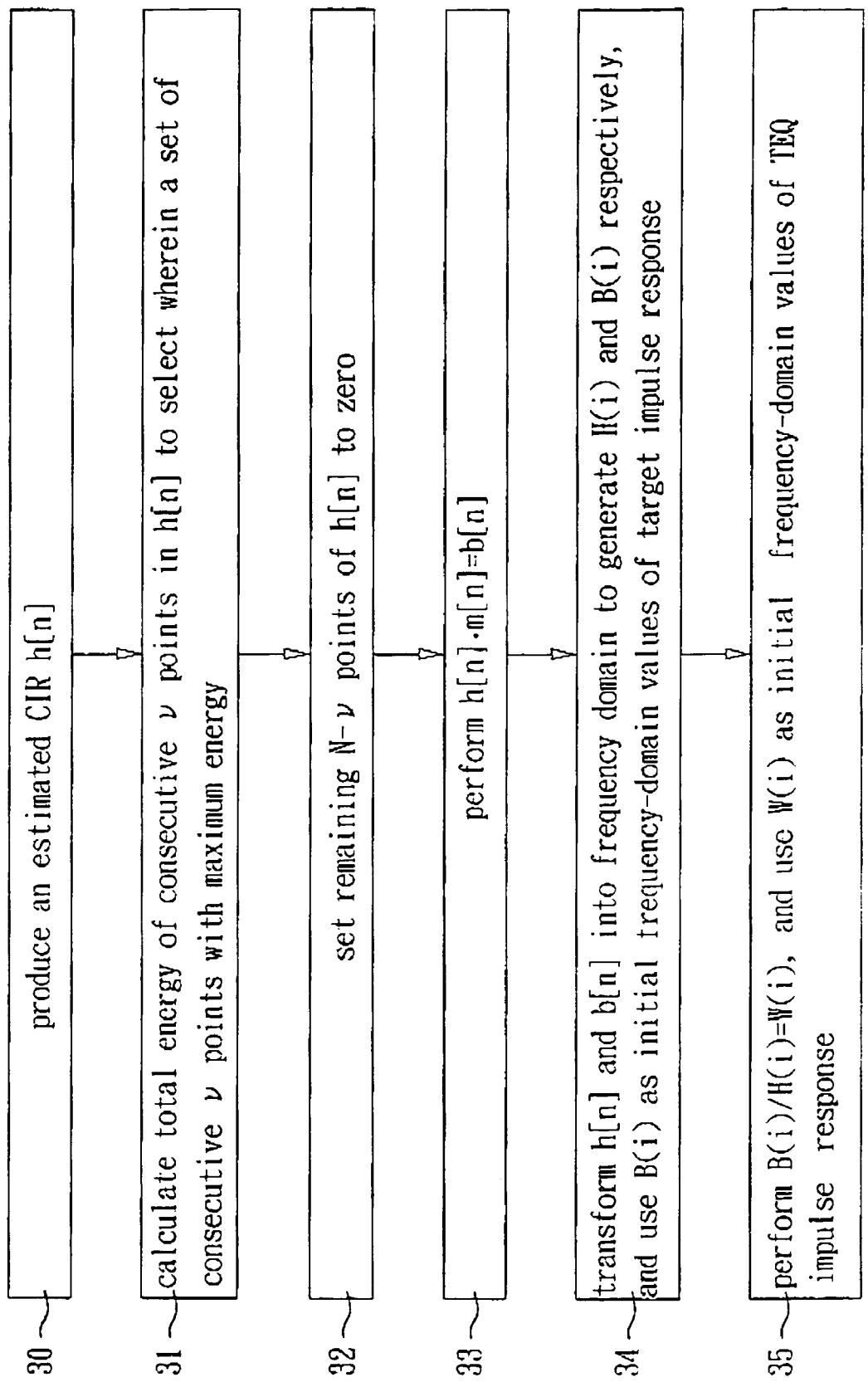
FIG. 3 is a flow chart of the method for determining the initial values of frequency-domain TEQ impulse response W[n] and target impulse response B[n] according to the first embodiment of the present invention.

FIG. 3 is a flow chart of the method for determining the initial values of frequency-domain TEQ impulse response W[n] and target impulse response B[n] according to the first embodiment of the present invention. As mentioned above, the TEQ 108 is used to shorten channel impulse response (CIR) of the multi-carrier communication system 100. The CIR is represented by a N-point sequence h[n], n=0~N−1. The communication system 100 encodes data as symbols for transceiving, wherein each symbol comprises N sampling points and a cyclic prefix with ν sampling points.

As shown in FIG. 3, the first embodiment for determining the initial values of frequency-domain TEQ impulse response W[n] and target impulse response B[n], which is called the Time-domain Window Mask method in the specification, includes steps of:

30 producing an estimated CIR h[n] according to the received symbols which are known by both of the receiver and the transmitter;

31 calculating the total energy of each group of consecutive ν points and selecting the group of consecutive ν points with the maximum energy;

32 setting all the remaining points outside the selected group to zero to generate a modified estimated CIR h[n];

33 multiplying the modified estimated CIR h[n] with a time-domain window mask m[n] to generate an estimated target impulse response b[n], wherein b[n]=h[n]·m[n], n=0~N−1;

34 transforming h[n] and b[n] into the frequency domain to generate H(i) and B(i) respectively, i=0~N−1, wherein B(i) is determined to be the initial value of the frequency-domain target impulse response; and 35 determining W(i) by dividing B(i) by H(i), i=0~N−1, wherein W(i) is determined to be the initial value of the frequency-domain TEQ impulse response.

The procedure of step 31 that the ν consecutive points with the highest total energy are found by a cyclic search through N points of h[n], that is, $$\sum_{n=k}^{k+\nu} |h[n]|^2,$$

k=0~N−1, is called the Locate Maximum Energy algorithm. The number of consecutive points of h[n] to perform the Locate Maximum Energy algorithm is determined such that the valid length of the estimated target impulse response b[n] is shorter than that of the cyclic prefix (having ν points). In this embodiment, it is ν consecutive points of h[n] with the highest total energy to be found through performing the Locate Maximum Energy algorithm. However, the value ν is not the limitation of the present invention.

In the step 33, if the points of h[k]~h[k+ν−1] are selected, the points of m[k]~m[k+ν−1] of the time-domain window mask m[n] are set to be the value between zero and one and the other points of m[n] are set to be zero to further modify the modified estimated CIR h[n].

Figure 4A:
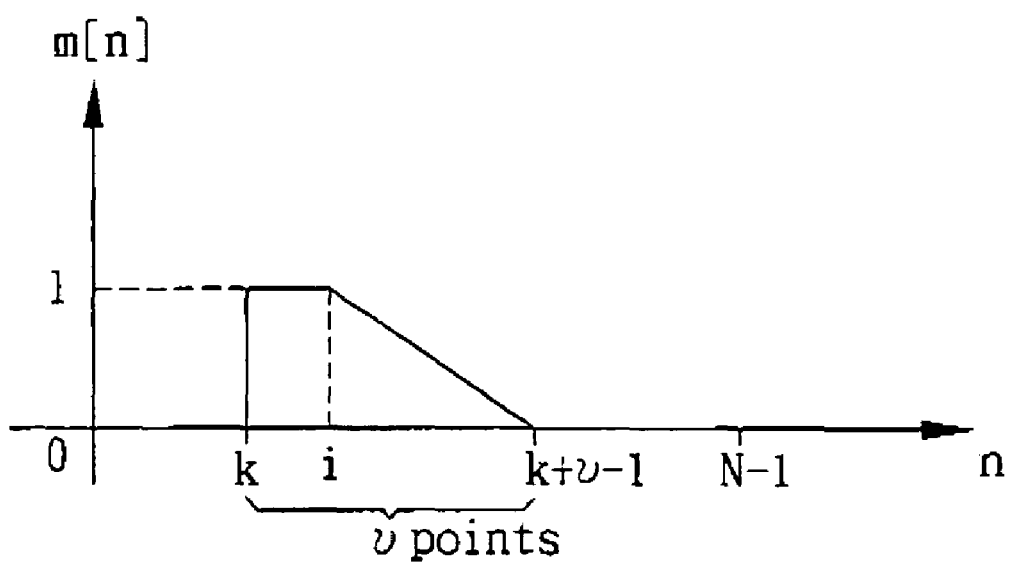
FIGS. 4A and 4B are diagrams showing two examples of the time-domain window mask.
Figure 4B:
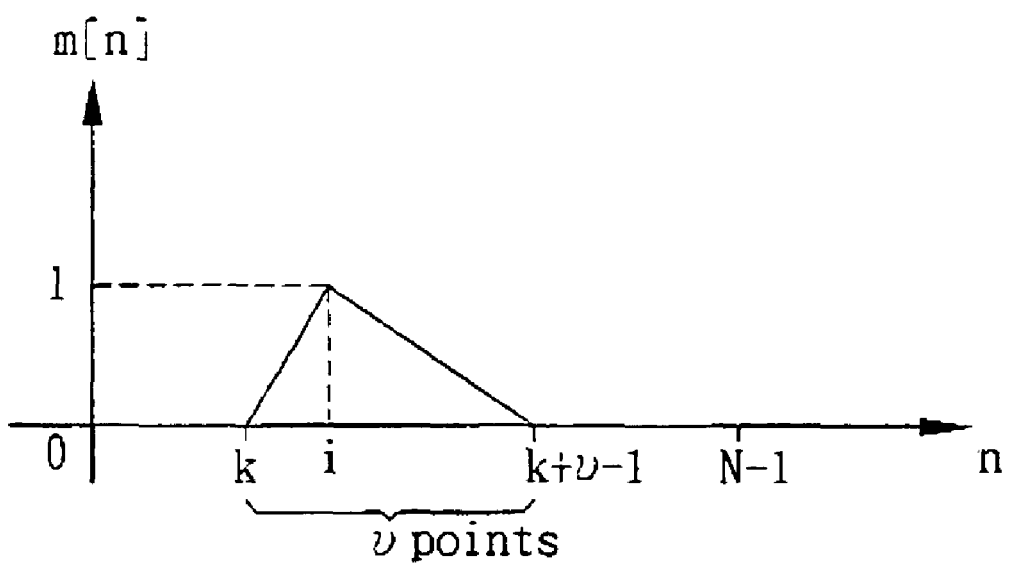

Since the difference between the boundary points of the selected group and the points outside and adjacent to the selected group (set to be zero) may be too large in value, the purpose of the time-domain window mask m[n] is to further modify the modified estimated CIR h[n] to reduce the difference of value between the boundary points of the selected group and the points outside and adjacent to the selected group. Thus, the determined initial value of the frequency domain TEQ impulse response will be more appropriate. In addition, in order to shorten the CIR h[n] by stepwise adapting the TEQ 108, the value of the "tail" (the last few points) of the generated target impulse response b[n] should be decreased gradually. In this manner, it is reasonable that the initial value of b[n] should have the similar property that the value of the "tail" of the initial b[n] should be decreased gradually. The purpose of the time-domain window mask m[n] is to further modify the modified estimated CIP h[n] not only to reduce the difference of value between the boundary points of the selected group and the points outside and adjacent to the selected group but to further modify the modified estimated CIP h[n] such that the value of the "tail" of the initial b[n] is decreased gradually. FIGS. 4A and 4B show two examples of the time-domain window mask m[n], which can be mathematically represented by $$m[n] = \begin{cases} 1; k \leq n \leq i \\ \frac{(k+\upsilon-1)-n}{(k+\upsilon-1)-i}; i < n \leq (k+\upsilon-1) \\ 0; \text{others} \end{cases}$$ (Fig. 4A)

and $$m[n] = \begin{cases} \frac{n-k}{i-k}; k \leq n \leq i \\ \frac{(k+\upsilon-1)-n}{(k+\upsilon-1)-i}; i < n \leq (k+\upsilon-1) \\ 0; \text{others}, \end{cases}$$ (Fig. 4B)

where i is an integer between k and k+v−1.

It is emphasized here that the "shape" of the time-domain window mask is subject to modification according to system requirements and not limited to the examples of FIGS. 4A and 4B.

In the step 34, h[n] and b[n] are transformed to the frequency domain by Fast Fourier Transform (FFT), which are represented by H(i) and B(i) respectively.

B(i) determined in step 34 and W(i) determined in the steps 35 are the initial values of frequency-domain TEQ impulse response W[n] and target impulse response B[n], which can be applied in various adaptive TEQ algorithms.

Figure 5:
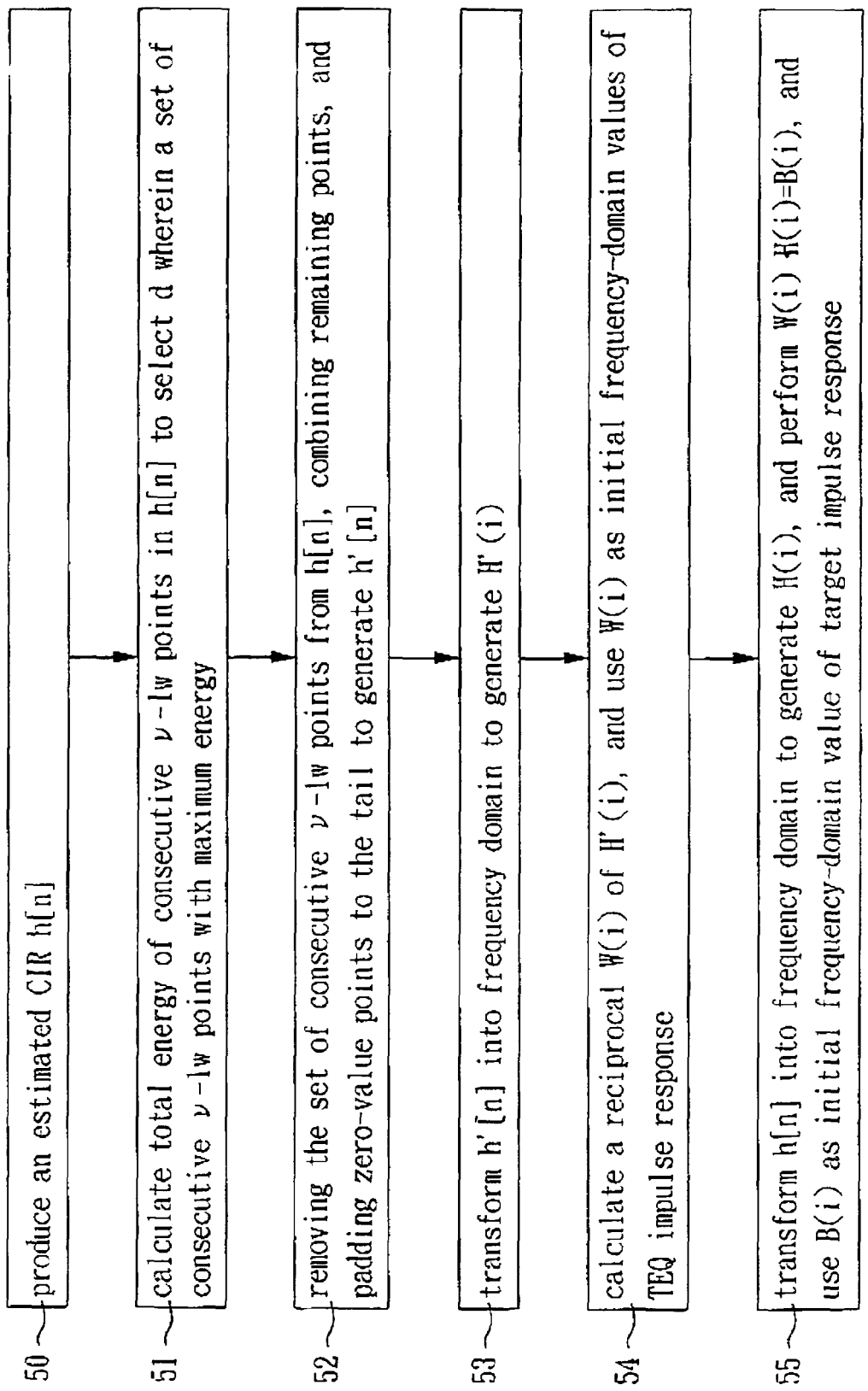
FIG. 5 is a flow chart of the method for determining the initial values of frequency-domain TEQ impulse response W[n] and target impulse response B[n] according to the second embodiment of the present invention.

FIG. 5 is a flow chart of the method for determining the initial values of frequency-domain TEQ impulse response W[n] and target impulse response B[n] according to the second embodiment of the present invention. The method includes steps of:

50 producing an estimated CIR h[n] according to the received symbols which are known by both of the receiver and the transmitter;

51 calculating the total energy of each group of consecutive $\upsilon-1_w$ points and selecting the group of consecutive $\upsilon-1_w$ points with the maximum energy, wherein $1_w$ is the length of the TEQ impulse response;

52 removing the group of consecutive $\upsilon-1_w$ points with the maximum energy from h[n], combining the remaining $N-\upsilon+1_w$ points, and padding zero to the last $\upsilon-1_w$ points of h[n] to produce a new N-point sequence h'[n];

53 transforming h'[n] into frequency domain to generate H'(i), i=0~N−1;

54 determining W(i) which is the reciprocal of H'(i), i=0~N−1, wherein W(i) is the initial value of the frequency-domain TEQ impulse response; and 55 transforming the original estimated CIR h[n] into frequency domain to generate H(i), and determining B(i) by multiplying W(i) with H(i), wherein i=0~N−1, and B(i) is the initial value of the frequency-domain target impulse response.

Based on the method disclosed in this embodiment, the w[n] (i.e. the impulse response of the TEQ 108) is determined such that the convolution of w[n] and the new N-point sequence h'[n] generated in the step 52 is an ideal impulse response. In this manner, the valid length of the target impulse response b[n], which is generated by the convolution of the w[n] and the original h[n], will be shorter. Thus, the target impulse response b[n] determined by the method disclosed in this embodiment will be more appropriate that the valid length of the target impulse response will be equal to or shorter than that of the cyclic prefix, i.e. v points.

In the step 51, the Locate maximum energy algorithm is performed. In the step 52, the group of consecutive $\upsilon-1_w$ points having the maximum energy are removed from h[n], the remaining points of h[n] are combined, and the last consecutive $\upsilon-1_w$ points are set to be zero to generate a new N-points sequence h'[n]. In the step 53, h'[n] is transformed into frequency domain by FFT, and H'(i) represents the FFT result of h'[n]. The W(i) and B(i) determined in the steps 54 and 55 respectively are the initial values of frequency-domain TEQ impulse response W[n] and target impulse response B[n], which can be applied in various adaptive TEQ algorithms.

Figure 6:
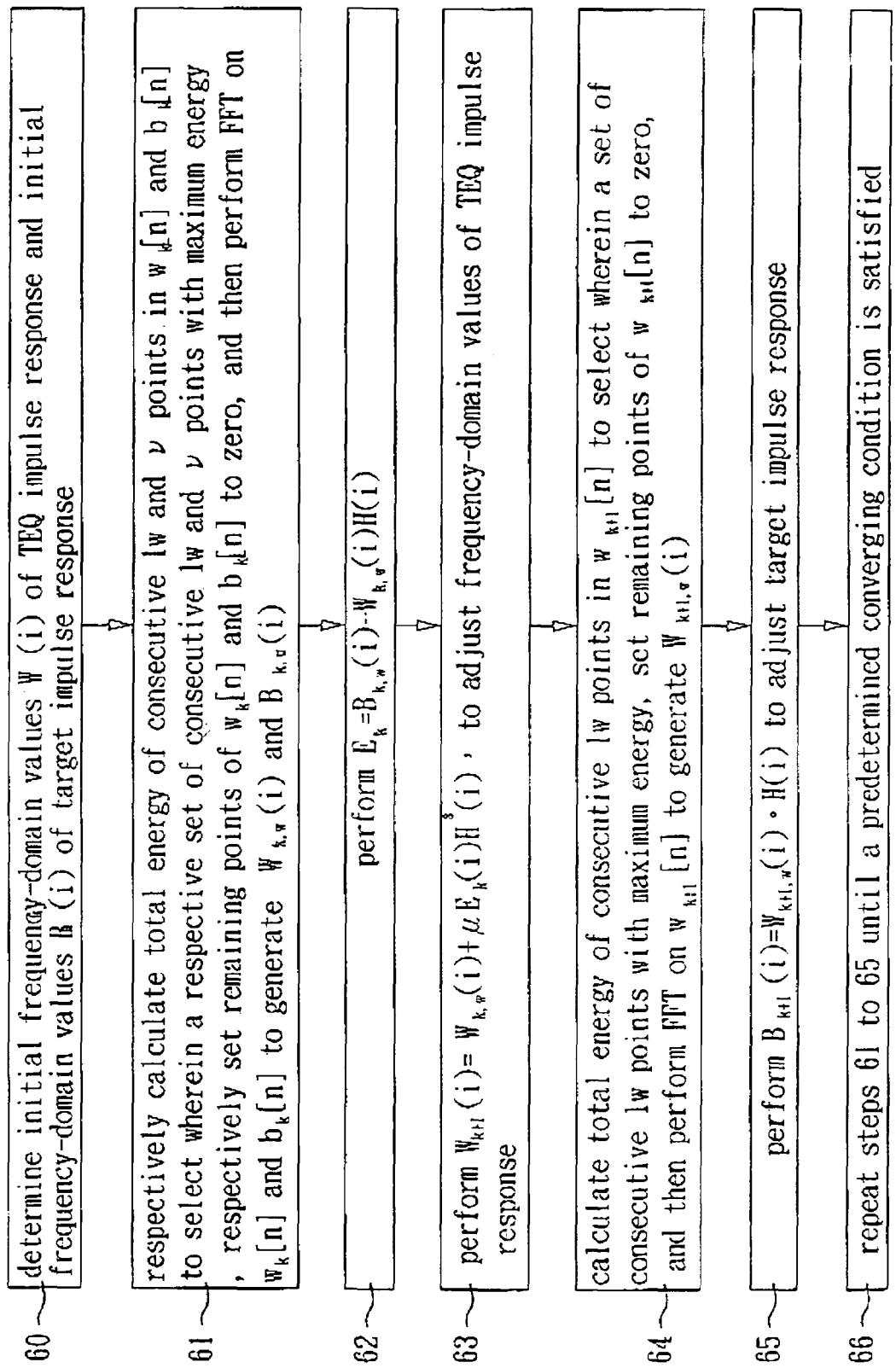
FIG. 6 is a flow chart of a typical adaptive TEQ algorithm.

FIG. 6 is a flow chart of a typical adaptive algorithm of the TEQ 108. As shown in FIG. 6, the algorithm is performed in an iterative way to adapt the TEQ 108 to in order to shorten the CIR of the communication system. The algorithm includes steps of:

60 determining initial value of frequency-domain TEQ impulse response $W_k[i]$ and target impulse response $B_k[i]$, wherein i=0~N−1, and k is the adapting index representing k-th iterative operation;

61 performing IFFT on $W_k[i]$ and $B_k[i]$ to generate $w_k[i]$ and $b_k[i]$ respectively. Then calculating the total energy of each group of consecutive $1_w$ points of $w_k[i]$ and selecting the group of consecutive $1_w$ points with the maximum energy, wherein $1_w$ is the length of the TEQ impulse response, and setting all the remaining points outside the selected group to zero to generate a modified time-domain TEQ impulse response $w_{k,w}[i]$. In the same time, calculating the total energy of each group of consecutive v points of $b_k[i]$ and selecting the group of consecutive v points with the maximum energy, and setting all the remaining points outside the selected group to zero to generate a modified time-domain target impulse response $b_{k,w}[i]$. Then performing FFT on $w_{k,w}[i]$ and $b_{k,w}[i]$ to generate $W_{k,w}(i)$ and $B_{k,w}(i)$ in frequency-domain, wherein i=0~N−1;

62 performing $E_k(i)=B_{k,w}(i)-W_{k,w}(i) \cdot H(i)$, i=0~N−1, wherein H(i) is the frequency-domain of h[n];

63 performing $W_{k+1}(i)$ $W_{k,w}(i)+\mu E_k(i) \cdot H^*(i)$, i=0~N−1, to adjust the value of the frequency-domain TEQ impulse response, wherein H*(i) is the complex conjugate of H(i) and μ is a stepsize coefficient;

64 performing IFFT on $W_{k+1}[i]$ to generate $w_{k+1}[i]$, then calculating the total energy of each group of consecutive $1_w$ points of $w_{k+1}[i]$ and selecting the group of consecutive $1_w$ points with the maximum energy, wherein $1_w$ is the length of the TEQ impulse response, and setting all the remaining points outside the selected group to zero to generate a modified time-domain TEQ impulse response $w_{k+1,w}[i]$. Then performing FFT on $w_{k+1,w}[i]$ to generate $W_{k+1,w}(i)$;

65 performing $B_{k+1,w}(i)=W_{k+1,w}(i)\cdot H(i)$ to adjust the value of the frequency-domain target impulse response; and 66 repeating the steps 61 to 65 until a predetermined converging condition is satisfied.

In the step 60, it should be noted that the method to determine the initial values of frequency-domain TEQ impulse response $W_k[i]$ and target impulse response $B_k[i]$ is not limited to the methods disclosed in this specification.

In the step 62, $E_k(i)$ can be regarded to be the error term generated by the adapting process.

In the step 63, the equation $W_{k+1}(i)=W_{k,w}(i)+\mu E_k(i)\cdot H^*(i)$ is the least-mean-square (LMS) algorithm. $\mu$ is the stepsize coefficient of the LMS algorithm. The value of $\mu$ may affect the performance of the LMS algorithm. If $\mu$ is too large, the LMS operation may easily lead to divergence. If $\mu$ is too small, the LMS operation may lead to bad local maxima and the speed of convergence will be too slow.

Based on the result of simulation, the value of $\mu$ is substantially in proportion to the reciprocal of the power of $H[i]$. This condition may be shown by the following equation: $\mu=const/power(H[i])$, wherein the value of const can be determined based on the result of simulation. It should be noted that divergence always occurs at an early stage of the adapting process if $\mu$ is too large.

In a conventional approach, $\mu$ is a time-invariant constant generated by experiments or simulations. However, in the embodiment of the present invention, $\mu$ is a time-variant function $\mu(k)$ throughout the adaptive process. Two methods for determining and controlling the value of the stepsize coefficient function $\mu(k)$ throughout the adapting process are disclosed in the specification.

The first method is called the power-ratio method in the specification, the method can be represented by the following equation:

$$\mu(k) = \frac{const}{power(H)} \times \log\frac{power(Wk)}{power(Wk-Wk-1)}$$

Based on the above equation, $\mu(k)$ will become large if power(Wk) is increasing and vise versa. The log function is used because the value of power(Wk)/power(Wk−Wk−1) increases exponentially during the adaptive process. If $(W_k-W_{k-1})$ is large, power(Wk)/power(Wk−Wk−1) will decrease such that divergence can be prevented. If $(W_k-W_{k-1})$ is small, power(Wk)/power(Wk−Wk−1) will increase such that speed of convergence can be speeded up. According to the result of simulation, the value of $\mu(k)$ will increase gradually in the early stage of the adaptive process, and then approach to a constant in the late stage of the adaptive process.

Figure 7:
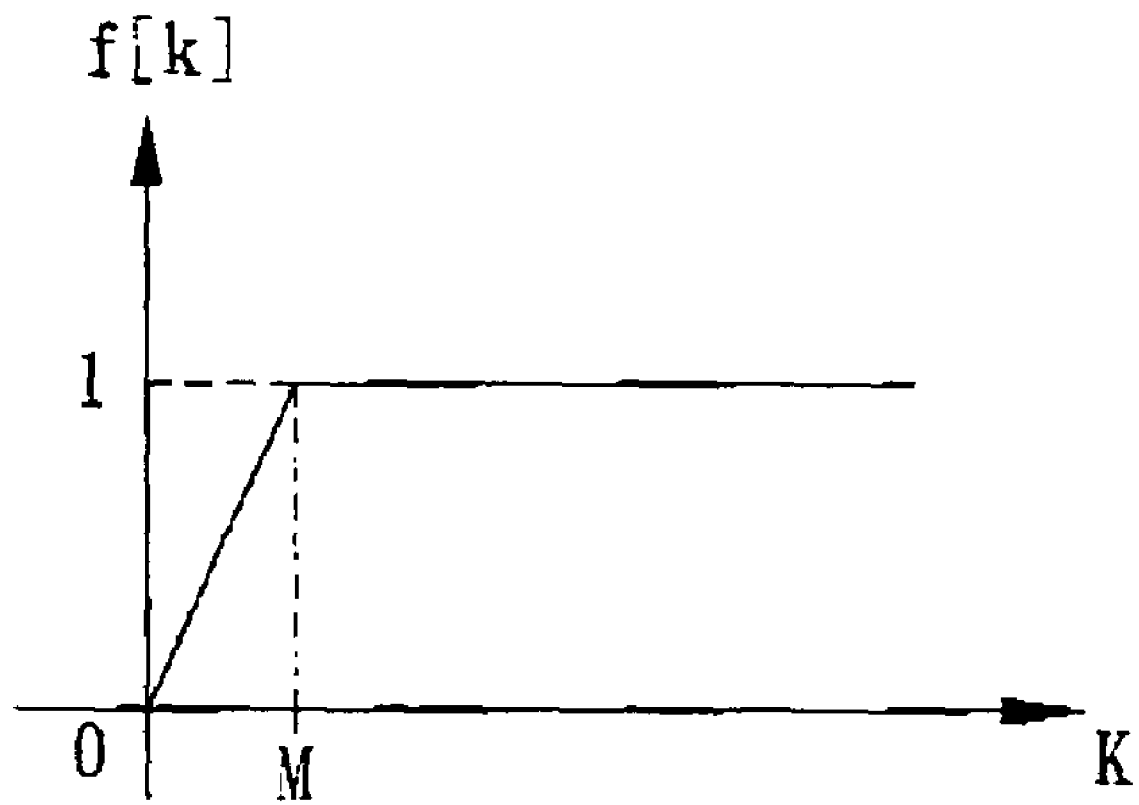
FIG. 7 is a diagram showing an example of the function f(k) used to determine the stepsize coefficient function according to the embodiment of the present invention.

The second method is called the fitting curve method in the specification. Through simulation, it is known that the value of $\mu(k)$ should keep small in the early stage of the adaptive process and then the value of $\mu(k)$ should become large in the late stage of the adaptive process. It can be accomplished by setting a predetermined fitting curve function. An example of stepsize coefficient function $\mu(k)$ is provided below, as shown in FIG. 7:

$$\mu(k) = \frac{const}{power(H)} \times f(k),$$

wherein $f(k) = k/M$, when $k <= M = 1$, when $k > M$ where k is the adapting index representing k-th iterative operation, and M is an integer which is preferably to be between 10 and 20.

In the above example, $\mu(k)$ is kept small in the early stage of the adapting process (i.e. k<M), while in the late stage of the adaptive process (k>M), $\mu(k)$ is kept to be a large constant to prevent from converging too slow. It should be noted that the above example function is one of the embodiments and may not be the limitation of the present invention.

In the step 65, the equation $B_{k+1}(i)=W_{k+1,w}(i)\cdot H(i)$ is called the zero-forcing criterion. The converging condition is not clearly determined in the step 66. Typically, the converging condition is predetermined to be that either the error $E_k$ smaller than a predetermined threshold or performing the steps 61~65 for a predetermined period of time.

While the present invention has been shown and described with reference to two preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. A method for initializing a time-domain equalizer (TEQ) comprised in a receiver of a multi-carrier communication system, the method comprising:

estimating a channel impulse response (CIR) h[n] according to a received symbol, wherein the received symbol includes a cyclic prefix with v points and a data portion with N points, wherein i=0~N−1;

selecting one of a plurality of groups according to the total energy of the groups, wherein each group includes consecutive v points of the received symbol;

modifying the channel impulse response (CIR) h[n] according to the selected group to generate a modified channel impulse response h'[n];

generating a target impulse response b[n] according to the modified channel impulse response h'[n] and a window mask m[n], wherein i=0~N−1;

transforming the channel impulse response (CIR) h[n] and the target impulse response b[n] to a frequency-domain to generate a frequency-domain channel impulse response H(i) and a frequency-domain target impulse response B(i) respectively, wherein i=0~N−1; and generating a frequency-domain impulse response W(i) of the time-domain equalizer according to the frequency-domain channel impulse response H(i) and the frequency-domain target impulse response B(i);

wherein the frequency-domain target impulse response B(i) and the frequency-domain TEQ impulse response W(i) are for initializing the TEQ.

2. The method of claim 1, wherein the h[n] and the b[n] are transformed to frequency domain by Fast Fourier Transform (FFT).

3. The method of claim 1, wherein the value of ν is smaller than or equal to v.

4. The method of claim 1, wherein the total energy of the selected group is maximum among that of all other groups.

5. The method of claim 4, wherein the group with ν consecutive points with the maximum total energy is selected by performing a cyclic search through N points of h[n].

6. The method of claim 1, wherein the channel impulse response (CIR) h[n] are modified by setting all the remaining points outside the selected group to zero.

7. The method of claim 1, wherein the target impulse response b[n] is generated by convolution the modified channel impulse response h'[n] and the window mask m[n].

8. The method of claim 1, wherein the window mask m[n] is to further modify the modified estimated CIR h[n] to reduce the difference of value between at least one boundary point of the selected group and at least one point outside and adjacent to the selected group.

9. The method of claim 1, wherein the window mask m[n] is to farther modify the modified estimated CIR h[n] such that the value of the "tail" of the initial b[n] is decreased gradually.

10. The method of claim 9, wherein the time-domain window mask m[n] is $$m[n] = \begin{cases} 1; k \le n \le i \\ \frac{(k+v-1)-n}{(k+v-1)-i}; i < n \le (k+v-1) \\ 0; \text{others} \end{cases},$$

wherein $i$ is an integer between $k$ and $k+v-1$.

11. The method of claim 9, wherein the time-domain window mask m[n] is $$m[n] = \begin{cases} \frac{n-k}{i-k}; k \le n \le i \\ \frac{(k+v-1)-n}{(k+v-1)-i}; i < n \le (k+v-1) \\ 0; \text{others} \end{cases},$$

wherein $i$ is an integer between $k$ and $k+v-1$.

12. The method of claim 1, wherein if the selected group of consecutive ν points of h[n] are h[k] to h[k+ν−1], then the values of m[k] to m[k+ν−1] of the window mask m[n] are set to lie between zero and one while the values of all other points of m[n] are set to be zero.

13. The method of claim 1, wherein the TEQ impulse response W(i) is determined through the frequency-domain target impulse response B(i) dividing by the frequency-domain impulse response H(i).

14. A method for initializing a time-domain equalizer (TEQ) comprised in a receiver of a multi-carrier communication system, the method comprising:
estimating a channel impulse response (CIR) h[n] according to a received symbol, wherein the received symbol includes a cyclic prefix with v points and a data portion with N points, wherein i=0~N−1;
selecting one of a plurality of groups according to the total energy of the groups, wherein each group includes consecutive $v-1_w$ points of the received symbol, wherein $1_w$ is the length of the TEQ impulse response;
modifying the channel impulse response (CIR) h[n] according to the selected group to generate a modified channel impulse response h'[n];
determining a frequency-domain impulse response W(i) according to a frequency-domain modified channel impulse response H'(i), wherein i=0~N−1; and
determining a frequency-domain target impulse response B(i) according to the frequency-domain impulse response W(i) and a frequency-domain CIR H(i), wherein i=0~N−1;
wherein the frequency-domain target impulse response B(i) and the frequency-domain TEQ impulse response W(i) are for initializing the TEQ.

15. The method of claim 14, wherein the h[n] and the h'[n] are transformed to frequency domain by Fast Fourier Transform (FFT).

16. The method of claim 14, wherein the value of ν is smaller than or equal to v.

17. The method of claim 14, wherein the total energy of the selected group is maximum among that of all other groups.

18. The method of claim 17, wherein the group with $v-1_w$ consecutive points with the maximum total energy is selected by performing a cyclic search through N points of h[n].

19. The method of claim 14, wherein the modified channel impulse response h'[n] is generated by:
removing the selected $v-1_w$ points from the CIR h[n];
combining the remaining $N-v+1_w$ points; and
padding zero to the last $v-1_w$ points of the CIR h[n].

20. The method of claim 14, wherein the frequency-domain impulse response W(i) is determined to be the reciprocal of the frequency-domain modified channel impulse response H'(i).

21. The method of claim 14, wherein the frequency-domain target impulse response B(i) is determined by multiplying the frequency-domain impulse response W(i) and the frequency-domain CIR H(i).

22. A method for adapting a time-domain equalizer (TEQ) comprised in a receiver of a multi-carrier communication system, the method comprising:
determining a frequency-domain TEQ impulse response Wk(i) and a frequency-domain target impulse response Bk(i) for initializing the TEQ, wherein i=0~N−1;
generating a modified TEQ impulse response $w_{k,w}(i)$ and a modified target impulse response $b_{k,w}(i)$ according to a time-domain TEQ impulse response $w_k(i)$ and a time-domain target impulse response $b_k(i)$;
determining a error term $E_k(i)$ according to the modified TEQ impulse response $w_{k,w}(i)$, a modified target impulse response $b_{k,w}(i)$, and a frequency-domain channel impulse response (CIR) H(i);
adjusting the frequency-domain TEQ impulse response $W_k(i)$ to generate a adjusted frequency-domain TEQ impulse response $W_{k+1}(i)$ through performing a least mean square (LMS) operation according to the error term $E_k(i)$, a frequency-domain modified TEQ impulse response $W_{k,w}(i)$, a frequency-domain channel impulse response (CIR) H(i), and a stepsize coefficient μ, wherein the stepsize coefficient μ in a time-varying coefficient;
generating a modified adjusted frequency-domain TEQ impulse response $W_{k+1,w}(i)$ according to the adjusted frequency-domain TEQ impulse response $W_{k+1}(i)$; and adjusting the frequency-domain target impulse response $B_k(i)$ to generate a adjusted frequency-domain target impulse response $B_{k+1}(i)$ according to the modified adjusted frequency-domain TEQ impulse response $W_{k+1,w}(i)$ and the frequency-domain channel impulse response (CIR) H(i).

23. The method of claim 22, wherein the adapting method is performed repeatedly to iteratively adjust the frequency-domain target impulse response and the frequency-domain TEQ impulse response, and an index k represents the time of the adapting method has been performed.

24. The method of claim 23, wherein the stepsize coefficient μ is a time-varying coefficient through the whole adapting process.

25. The method of claim 24, wherein the stepsize coefficient μ is dynamically adjusted through the whole adapting process to prevent divergence at a early stage of the adapting process and to prevent slow convergence at a late stage of the adaptive process.

26. The method of claim 25, wherein the value of the stepsize coefficient μ is a small value at a early stage of the adapting process and the value of the stepsize coefficient μ is a large value at a late stage of the adapting process.

27. The method of claim 26, wherein the value of the stepsize coefficient μ is small and increase gradually at the early stage of the adapting process.

28. The method of claim 26, wherein the value of the stepsize coefficient μ is a constant at the late stage of the adapting process.

29. The method of claim 26, wherein the value of the stepsize coefficient μ is in proportion to the reciprocal of the power of the frequency-domain channel impulse response (CIR) H(i).

30. The method of claim 26, wherein the value of the stepsize coefficient μ is determined by the following equation:

$$\mu(k) = \frac{const}{power(H)} \times \log\frac{power(W_k)}{power(W_k - W_{k-1})},$$

wherein power(H) represents the power of the frequency-domain channel impulse response (CIR) H(i), power($W_k$) represents the power of the frequency-domain TEQ impulse response $W_k(i)$, and power($W_k - W_{k-1}$) represents the power of a change of the frequency-domain TEQ impulse response $W_k(i) - W_{k-1}(i)$.

31. The method of claim 26, wherein the value of the stepsize coefficient μ is determined by the following equation:

$$\mu(k) = \frac{const}{power(H)} \times f(k),$$

wherein power(H) represents the power of the frequency-domain channel impulse response (CIR) H(i) and f(k) represents a fitting curve function.

32. The method of claim 31, wherein the fitting curve function is
   if k<=M, then f(k)=k/M;
   if k>M, f(k)=1, wherein the index k represents the time of the adapting method has been performed and M is an integer between 10 and 20.

* * * * *